(12) United States Patent
Murray et al.

(10) Patent No.: US 6,606,083 B1
(45) Date of Patent: Aug. 12, 2003

(54) INTEGRATED ANTENNA AND INPUT DEVICE

(75) Inventors: Thomas A. Murray, Plantation, FL (US); Jose E. Korneluk, Boynton Beach, FL (US); Alessandro Perrotta, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/449,950

(22) Filed: Nov. 29, 1999

(51) Int. Cl.[7] ................................................. G09G 5/08
(52) U.S. Cl. ........................ 345/158; 455/575; 455/90; 345/161
(58) Field of Search ........................ 345/158, 156–157, 345/161; 273/148 B; 455/90, 575; 343/702; 379/428; 463/36–39

(56) References Cited

U.S. PATENT DOCUMENTS

| | | | | |
|---|---|---|---|---|
| 5,321,738 A | * | 6/1994 | Ha ................................ | 455/575 |
| 5,497,506 A | * | 3/1996 | Takeyasu ...................... | 455/562 |
| 5,828,341 A | * | 10/1998 | Delamater .................... | 343/702 |
| 5,898,933 A | * | 4/1999 | Kaschke ....................... | 455/575 |
| 5,983,119 A | * | 11/1999 | Martin et al. ................. | 455/575 |
| 6,040,823 A | * | 3/2000 | Seffernick et al. ........... | 345/168 |
| 6,239,786 B1 | * | 5/2001 | Burry et al. .................. | 345/161 |

* cited by examiner

*Primary Examiner*—Richard Hjerpe
*Assistant Examiner*—Francis Nguyen
(74) *Attorney, Agent, or Firm*—Scott M. Garrett

(57) ABSTRACT

An integrated antenna and input device is provided that includes an antenna for transmitting and/or receiving electronic signals, and strain sensing elements coupled to the antenna. The strain sensing elements detect directional movement of the antenna. Additionally, an electronic communication device is provided. The device includes a graphical display, a control circuit, an antenna, and at least one sensor. The control circuit displays information on the graphical display, and the antenna transmits and/or receives electronic signals. The sensor is coupled to the antenna and the control circuit, and relays directional movement of the antenna to the control circuit to navigate the displayed information or select specific functions of the communication device.

16 Claims, 4 Drawing Sheets

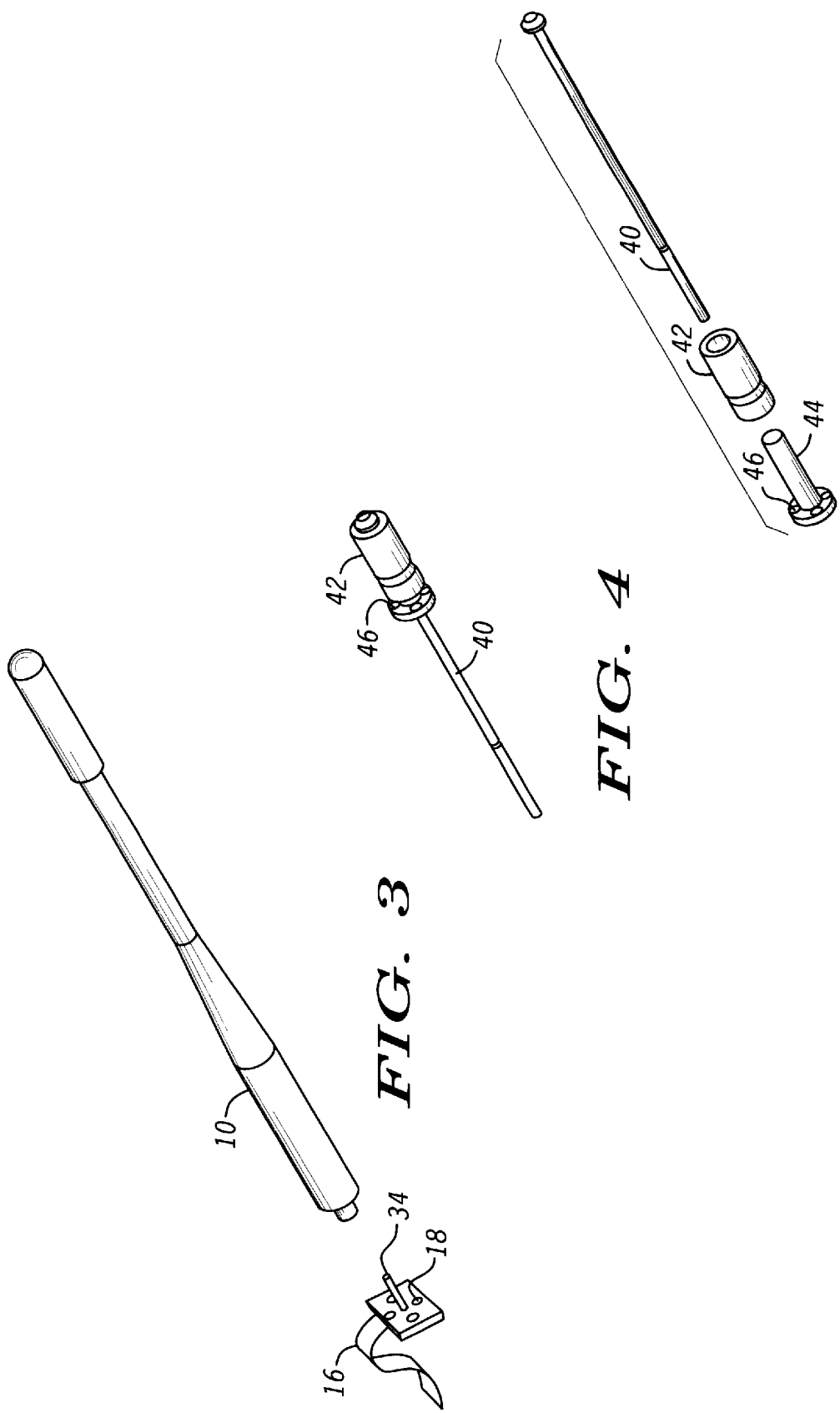

INTEGRATED ANTENNA AND INPUT DEVICE

BACKGROUND OF THE INVENTION

1. Field of the Invention

The present invention relates to electronic devices, and more specifically to an electronic communication device with an integrated antenna and joystick-style input device.

2. Description of Related Art

Portable electronic communication devices are increasing in popularity. Furthermore, they are increasing in complexity and functionality. In such devices, graphical displays are generally the user interface of choice for easily accessing and controlling device functions. Additionally, graphical displays are becoming more important in newer portable communication devices that have comparable computing power and many of the same functions (e.g., full Internet browsing capability) as desktop computers. Typically, the graphical display is used to present the user with visual menus or icons representing the available functions. The users can easily view and select desired functions by navigating an on-screen cursor.

As such graphical displays become standard and software interfaces become more complex, an efficient and easy to use input device becomes a critical component for navigating the graphical display and selecting desired functions. At the same time, it is highly desirable to minimize the overall size and weight of the communication device. Conventionally, a separate input device is added as an additional component to the housing of the device, with a corresponding increase in the overall size and weight of the device.

For example, the graphic display is typically navigated using an on-screen cursor that is manipulated by special controls such as designated up, down, left, and right directional keys; up-down and left-right toggle switches; a rotating dial; or a joystick.

However, all of these controls require space on the device housing, and therefore increase the overall size of the device. Furthermore, they occupy valuable space on the printed circuit board of the device. Thus, a separate conventional input device does not fulfill the two design objectives of providing for efficient input and minimizing the overall size and weight of the device.

SUMMARY OF THE INVENTION

One aspect of the present invention provides an integrated antenna and input device. The integrated input device allows for efficient input, and its integration with the antenna eliminates the need for additional space on the device housing.

Another aspect of the present invention provides an electronic communication device with an integrated antenna and input device.

One preferred embodiment of the present invention provides an integrated antenna and input device that includes an antenna for transmitting and/or receiving electronic signals, and strain sensing elements coupled to the antenna. The strain sensing elements detect directional movement of the antenna.

Another preferred embodiment of the present invention provides an electronic communication device that includes a graphical display, a control circuit, an antenna, and at least one sensor. The control circuit displays information on the graphical display, and the antenna transmits and/or receives electronic signals. The sensor is coupled to the antenna and the control circuit, and relays directional movement of the antenna to the control circuit to navigate the displayed information or select specific functions of the communication device.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 3 is a diagram showing an exploded view of an integrated antenna and input device according to a second embodiment of the present invention;

FIG. 4 is a diagram showing an integrated antenna and input device according to a third embodiment of the present invention;

FIG. 5 is a diagram showing an exploded view of the integrated antenna and input device of FIG. 4;

DETAILED DESCRIPTION OF PREFERRED EMBODIMENTS

Preferred embodiments of the present invention will be described in detail hereinbelow with reference to the attached drawings. In the following description, the term "radio" is meant to include all types of electronic communication devices.

Figure 2:
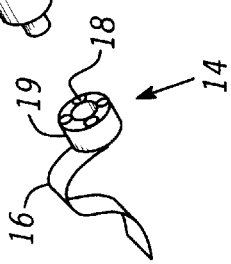
FIG. 2 is a diagram showing an exploded view of the integrated antenna and input device of FIG. 1.
Figure 1:
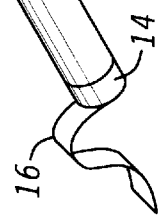
FIG. 1 is a diagram showing an integrated antenna and input device according to a first embodiment of the present invention.

FIGS. 1 and 2 show an integrated antenna and input device according to a first embodiment of the present invention. An antenna 10 is coupled (e.g., using adhesive or a screw) to a directional strain sensing device 14. In the first embodiment, the strain sensing device 14 is formed by attaching four strain sensing elements 18 to a bushing 19. The strain sensing elements 18 are coupled to a flex circuit 16 that provides electrical connection to an electronic device. FIG. 3 shows an integrated antenna and input device according to a second embodiment of the present invention. The second embodiment is similar to the first embodiment, except that in the second embodiment, the strain sensing elements 18 are attached to a rigid joystick base 34. More specifically, the joystick 34 is inserted into the axis of the antenna 10.

During operation, the antenna transmits and receives information in a standard manner, and also is manipulated by the user to input information into the associated electronic device. In particular, directional movement of the antenna 10 that is normal to the axis of the antenna base 14 or 34 is detected by the strain sensing elements 18 and relayed to the electronic device through the flex circuit 16. The electronic device generates corresponding output on a graphical display. Thus, the antenna 10 can be used as a joystick-style input device. Preferably, the antenna is reasonably stout and has substantial resistance to bending so that it can function effectively as a standard joystick.

In one preferred embodiment, the antenna 10 is a top loaded antenna with the active region located near the top of the antenna. This allows the active antenna region to remain uncovered when the user grips the lower portion of the antenna for directional input. Enhanced ergonomics are achieved by using the antenna as a joystick-style input device with the joystick feeling comfortable to the hand due to familiarity from common use in video games. Additionally, a joystick provides quicker, more natural movements for directional input as compared with typical portable device controls such as directional keys and toggle switches that require multiple key presses or constant pressure. An example of an antenna for use in the first and second embodiments is an end-fed ½ wave fixed antenna.

FIGS. 4 and 5 show an integrated antenna and input device according to a third embodiment of the present invention. In this embodiment, a retractable antenna 40 is coupled to a hollow tube assembly. The hollow tube assembly includes a bezel or lower coil assembly 42 and a hollow tube joystick 44 that has strain sensing devices 46. In the third embodiment, the hollow tube joystick permits the antenna to be retracted through its center, as shown in FIG. 4. The hollow tube joystick 44 is molded into the lower coil assembly 42 and mounted on the housing of an electronic device.

The lower coil assembly 42 provides a firm gripping area around the base of the antenna to allow the antenna to be effectively maneuvered as a joystick. As in the previous embodiments, the strain sensing elements 46 attached to the hollow tube joystick 44 detect user input (i.e., directional force) and relay signals to the electronic device through a flex circuit or other electrical connection. Because the antenna can be retracted inside the electronic device when not in use, the overall size of the device is further reduced. One example of an antenna for use in the third embodiment is a ¼ wave antenna.

Figure 6:
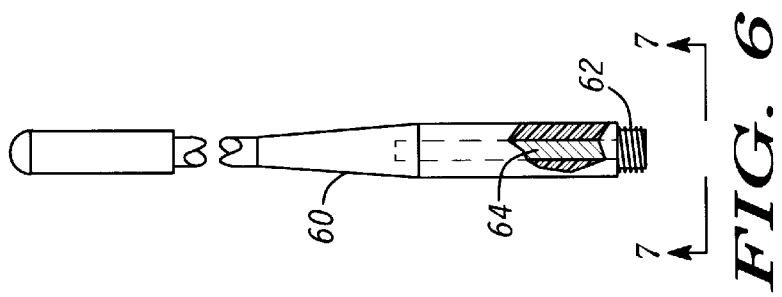
FIG. 6 is a diagram showing a side view of an integrated antenna and input device according to a fourth embodiment of the present invention.
Figure 7:
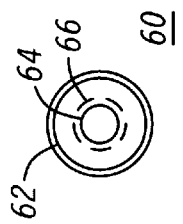
FIG. 7 is a diagram showing a top view of the strain sensing elements of the integrated antenna and input device of FIG. 6.

FIG. 6 shows a side view of an integrated antenna and input device according to a fourth embodiment of the present invention. An antenna 60 is attached to a base or collar 62 that is in combination with an internal strain sensing device 64. The internal strain sensing device 64 includes an internal flex shaft and an array of strain sensing elements 66, as shown in the top view of FIG. 7. In this exemplary embodiment, four strain sensing elements 66 are oriented at right angles to one another. However, in further embodiments, any number of strain sensing elements can be coupled to the antenna (e.g., to increase the precision of movement detection when finer cursor movements are required for particular graphical display functions).

Figure 8:
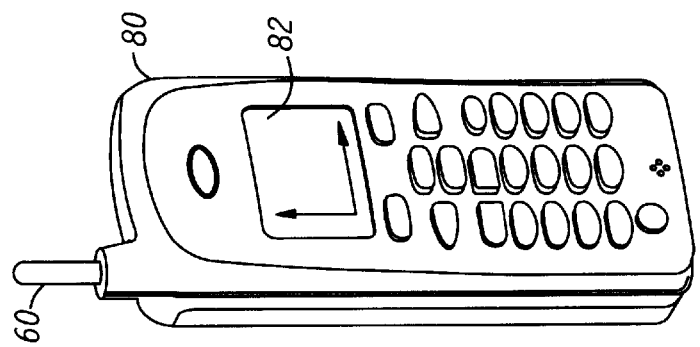
FIG. 8 is a diagram showing the integrated antenna and input device of FIG. 6 attached to a radio housing.

As in the previous embodiments, the strain sensing elements 66 detect directional input from movement of the antenna. One type of antenna for use in the fourth embodiment is a top loaded "stubby" flex antenna. FIG. 8 shows the integrated antenna and input device of FIG. 6 attached to a radio housing. The internal flex shaft of the antenna 60 is connected to a base that is mounted securely inside the radio housing 80. As explained above, directional movements of the antenna 60 are relayed through the flex shaft and strain sensing elements for translation into navigational movements on the display 82 of the radio device 80.

Figure 9:
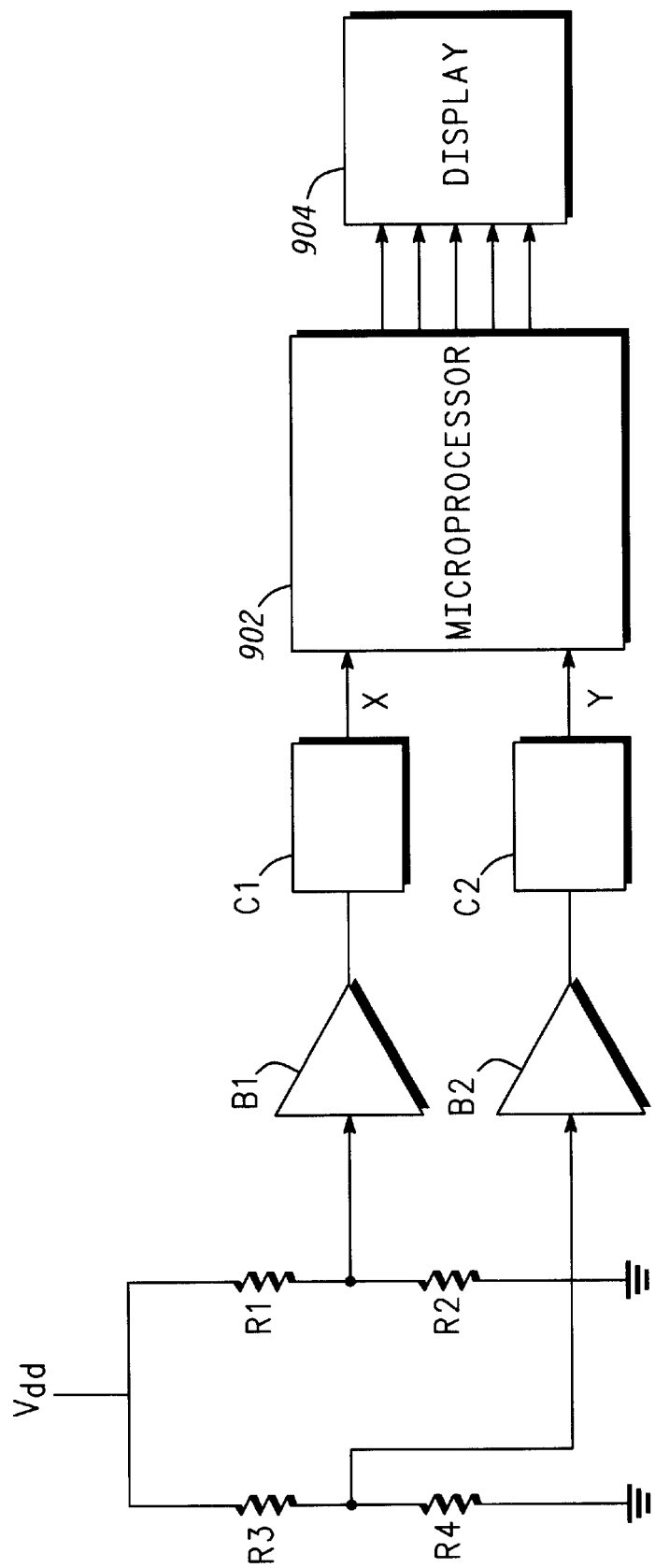
FIG. 9 is a block diagram showing exemplary circuitry for translating movement of the integrated antenna and input device in an electronic device.

FIG. 9 shows exemplary circuitry for translating movement of the integrated antenna and input device to output on a graphical display 904. The strain sensing elements of the integrated device are provided through four resistive elements R1 through R4 that detect directional movement of the antenna. Resistive elements R1 and R2 are connected in series between a supply voltage Vdd and ground to detect movement in the x (or left-right) direction, and resistive elements R3 and R4 are similarly connected in series between the supply voltage Vdd and ground to detect movement in the y (or up-down) direction. A first amplifying buffer B1 is connected between resistive elements R1 and R2 to amplify the x-direction signal as detected by those elements, and a second amplifying buffer B2 is similarly connected between resistive elements R3 and R4 to amplify the y-direction signal.

Each of the amplified signals is supplied to a wave shaping and threshold comparison circuits C1, C2. The signal is first filtered to remove undesirable effects such as mechanical bounce, and then it is determined if the signal exceeds a predetermined threshold that indicates directional movement of the integrated device. If the signal is above the threshold level, the wave shaping and threshold comparison circuits C1, C2 relay a signal to a microprocessor or control unit 902 of the electronic device. Based on the received signals, the microprocessor generates the appropriate output on the graphical display. Thus, directional movement of the integrated device is translated into corresponding movement (e.g., cursor movement) on the graphical display 904.

Accordingly, the present invention provides an integrated antenna and input device. An array of strain sensing elements is coupled to the antenna to allow the antenna to be used as a joystick-style input device for navigating a graphical display. The integration of the antenna and input device serves to provide an extremely compact input device. Preferably, the strain-sensing elements are mounted to the base of the antenna, so no additional space is required for the input device. Thus, the size of the electronic device is reduced while ergonomics are enhanced.

By eliminating the need for designated space on the device housing or printed circuit board for a separate input device, other features can be to be added to the device without an increase in size. For example, space that would conventionally be required for an input device could instead be used to provide a larger and easier to read full graphical display. Furthermore, the integration of the input device does not alter the symmetry of the antenna, and does not add any complex moving parts. The present invention is well suited for use in all electronic communication devices that require an antenna and an input device, and is especially suited for use in portable radios or telephones that require a simple input device for selecting from a list of displayed options or navigating a graphical display.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein.

Therefore, it is intended that the present invention not be limited to the particular embodiments disclosed, but that the invention include all embodiments falling within the scope of the appended claims.

What is claimed is:

1. An integrated antenna and input device, comprising:
   an antenna for transmitting and/or receiving electronic signals;
   strain sensing elements coupled to the antenna, the strain sensing elements detecting directional movement of the antenna when the directional movement is normal to an axis of the antenna; and
   a hollow tube joystick for housing the strain sensing elements.

2. The integrated antenna and input device as defined in claim 1, further comprising a connector for coupling the strain sensing elements to a control circuit.

3. The integrated antenna and input device as defined in claim 1, further comprising a bushing for housing the strain sensing elements.

4. The integrated antenna and input device as defined in claim 1, further comprising a rigid joystick base for housing the strain sensing elements.

5. The integrated antenna and input device as defined in claim 1, wherein the antenna can be retracted through the hollow tube joystick.

6. The integrated antenna and input device as defined in claim 1, wherein at least four strain sensing elements are coupled to the antenna.

7. An electronic communication device, comprising:
   a graphical display;
   a control circuit for displaying information on the graphical display;
   an antenna for transmitting and/or receiving electronic signals;
   at least one sensor coupled to the antenna and the control circuit, and
   at least one threshold comparator coupled between the strain elements and the control circuit;
   wherein the sensor relays directional movement of the antenna to the control circuit to navigate the displayed information or select specific functions of the communication device when the directional movement is normal to an axis of the antenna.

8. The electronic communication device as defined in claim 7, further comprising a bushing for housing the strain elements.

9. The electronic communication device as defined in claim 7, further comprising a rigid joystick base for housing the strain elements.

10. The electronic communication device as defined in claim 7, further comprising a hollow tube joystick for housing the strain elements.

11. The electronic communication device as defined in claim 7, wherein the strain elements include at least four strain sensing elements.

12. An electronic device, comprising:
   a graphical display;
   a microprocessor for displaying information on the graphical display;
   an antenna for transmitting and/or receiving electronic signals;
   a plurality of strain elements coupled to the antenna and the microprocessor; and
   at least one threshold comparator coupled between the strain elements and the microprocessor;
   wherein the strain elements detect directional movement of the antenna and the microprocessor controls a display cursor based on the detected movement when the directional movement is normal to an axis of the antenna.

13. The electronic device as defined in claim 12, further comprising a rigid joystick base for housing the strain elements.

14. The electronic device as defined in claim 12, further comprising a hollow tube joystick for housing the strain elements.

15. The electronic device as defined in claim 12, wherein the strain elements include at least four strain sensing elements.

16. The electronic device as defined in claim 12, further comprising a bushing for housing the strain elements.

* * * * *